July 9, 1946.  E. E. LAKSO  2,403,862
ARTICLE DELIVERING APPARATUS
Filed April 20, 1942  4 Sheets-Sheet 3
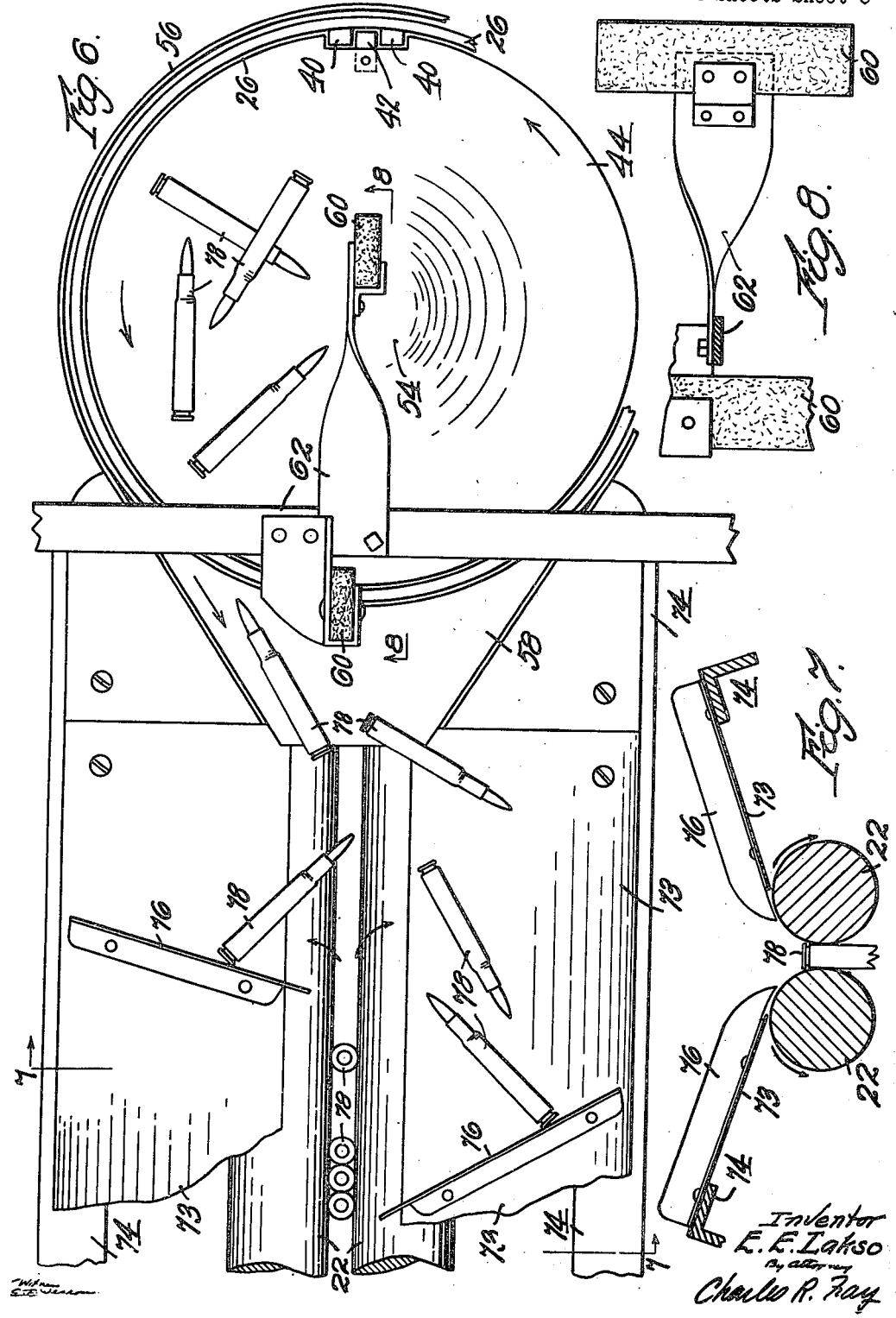

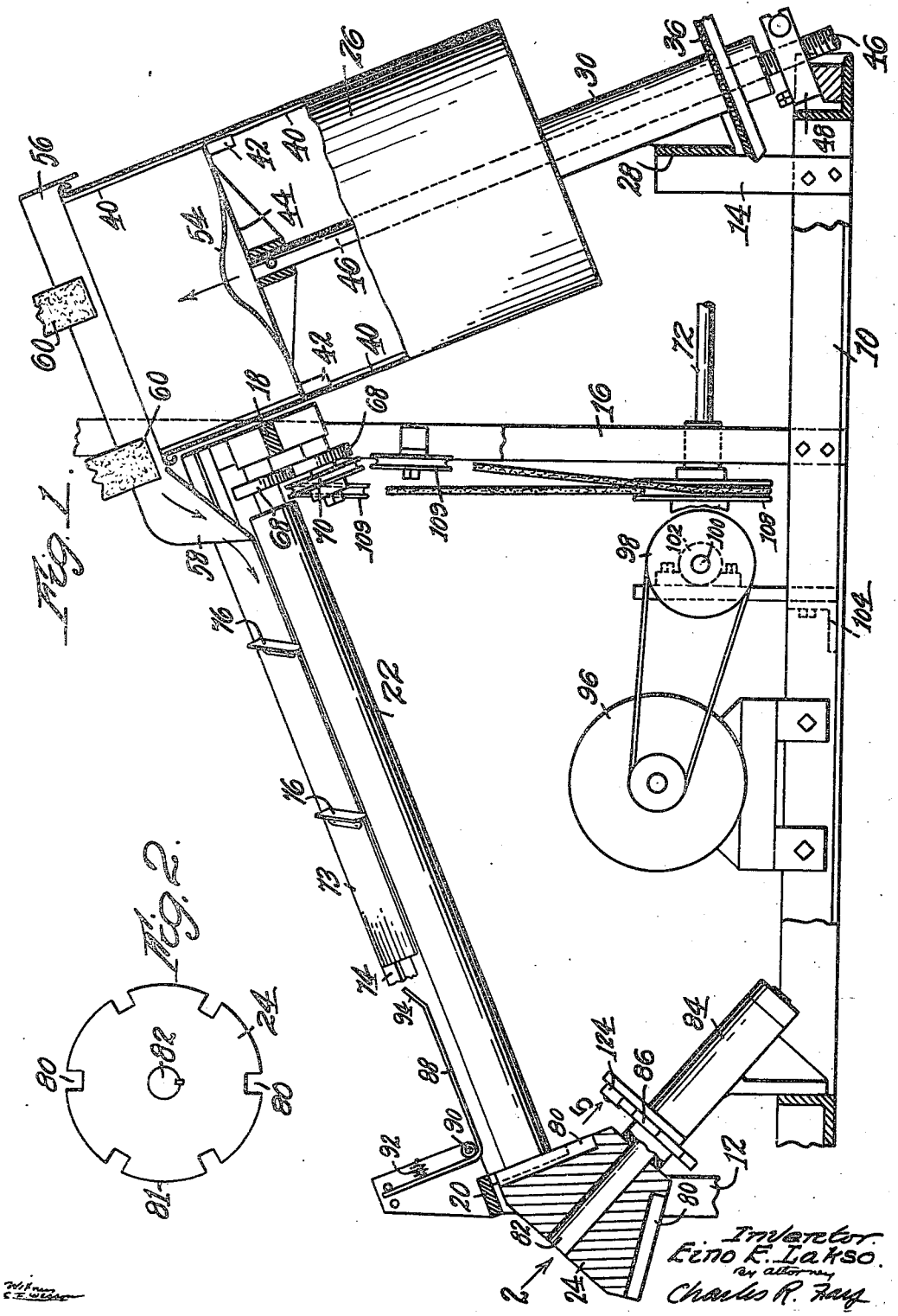

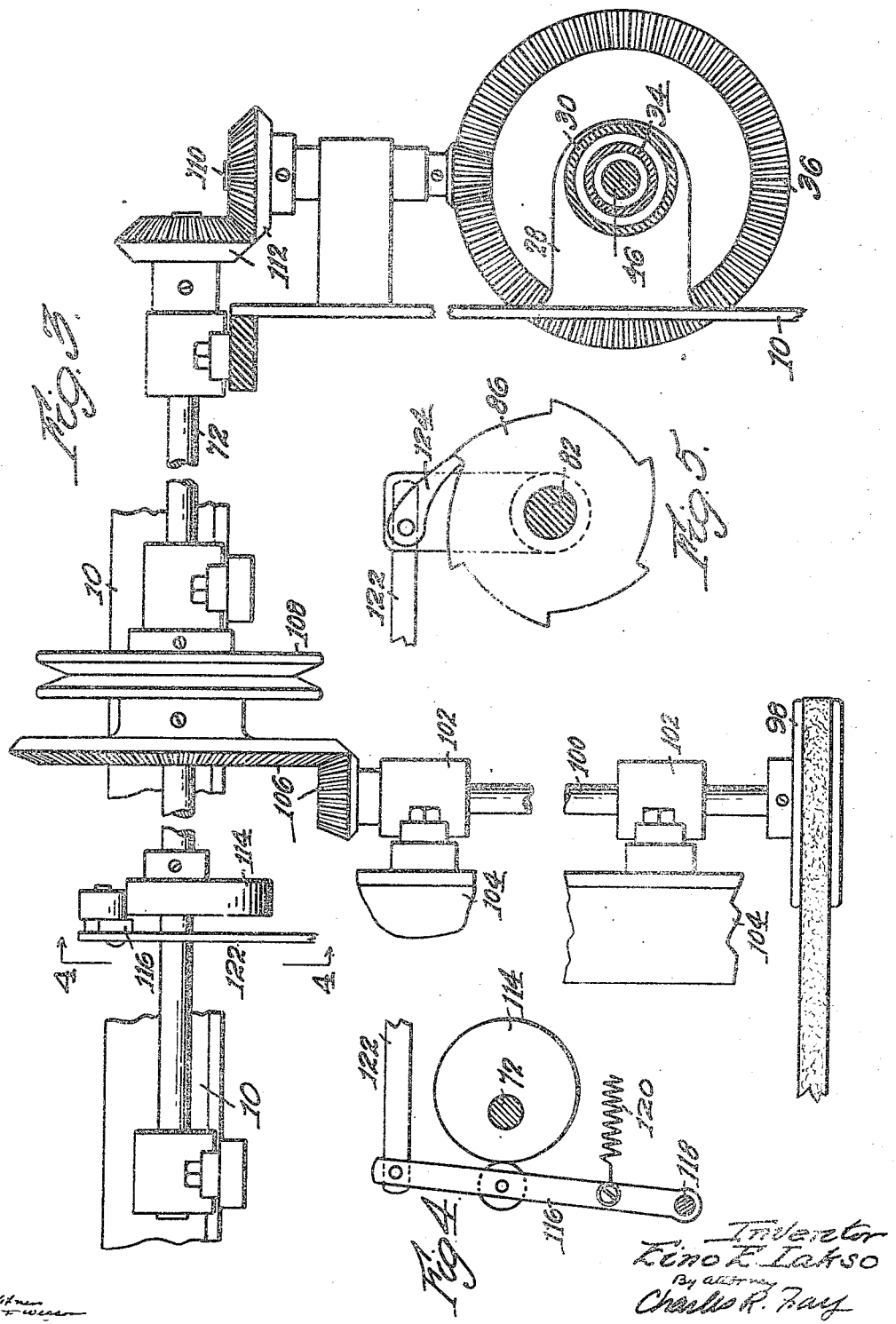

July 9, 1946.  E. E. LAKSO  2,403,862
ARTICLE DELIVERING APPARATUS
Filed April 20, 1942  4 Sheets-Sheet 4
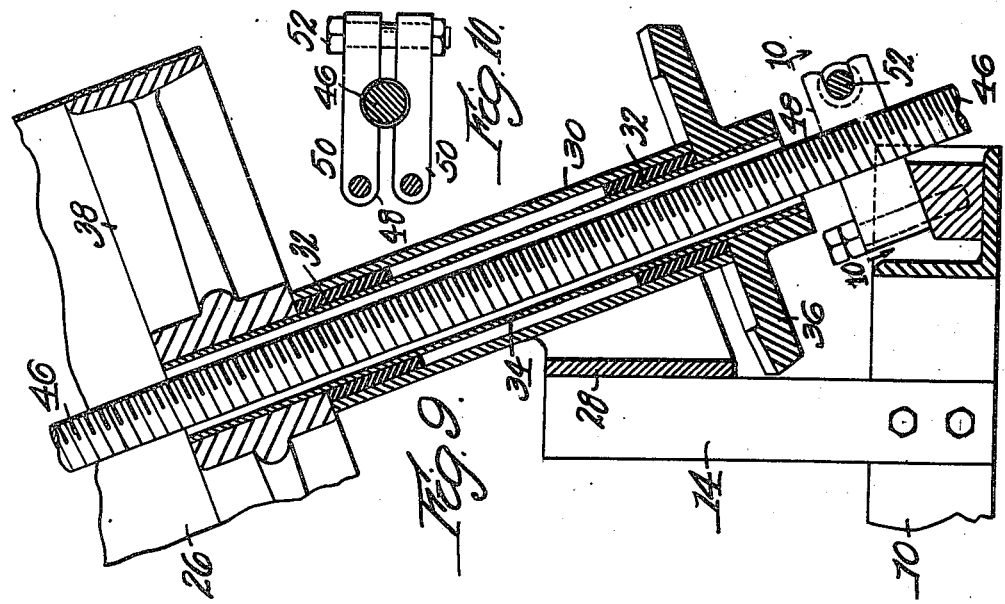

Patented July 9, 1946

2,403,862

UNITED STATES PATENT OFFICE 2,403,862

ARTICLE DELIVERING APPARATUS

Eino E. Lakso, Fitchburg, Mass.

Application April 20, 1942, Serial No. 439,674

1 Claim. (Cl. 198—53)

This invention relates to apparatus for delivering articles arranged in no predetermined alignment at a controlled, predetermined rate to an aligning or transferring apparatus, these mechanisms being chiefly used for feeding helter-skelter articles into certain aligned or orderly relation preparatory to packaging or the like.

Objects of the invention include the provision of hopper means for receiving a plurality of articles in helter-skelter condition as they come from the machine manufacturing the same or from other sources, in combination with means effective to gradually force the helter-skelter articles from the hopper to some other operative apparatus, at a controlled predetermined rate of delivery, so that no manual action is necessary to feed the articles from the hopper and so that just the desired number of articles per period of time desired will be expelled from the hopper to be delivered to the subsequent operating devices.

Further objects of the invention include the provision of a hopper for receiving a load of misaligned articles in helter-skelter condition, and means in the hopper for expelling the articles therefrom at a desired predetermined rate of speed to a device which may include article aligning means, so that the latter will neither "starve" nor receive more articles to be aligned than it can handle, whereby the helter-skelter articles will enter the aligning device or the like in orderly precision as to rate of delivery thereto, and whereby any manual controlling action of either the hopper or the aligning device is rendered unnecessary; the provision of a rotating hopper having a separate floor or the like which is driven to progress through the hopper at a controlled, predetermined rate of speed to expel articles therefrom in helter-skelter condition, so that said articles are delivered at a known rate to an aligning device comprising a chute, said articles being aligned in the chute and traveling therein to a timed transfer device, whereby the articles will be arranged in contacting, single file relation at the bottom of the chute to provide for a continuous load at all times for the transfer device, and whereby the chute and transfer device will neither become overloaded, nor "starve" so as to allow the transfer device to operate with a continuous supply of articles in the chute.

Other objects of the invention include the provision of a double hopper arrangement for alternate operation so that the aligning and transfer devices are continually operable without stopping to charge a hopper.

Other objects and advantages of the invention will appear hereinafter.

Reference is to be had to the accompanying drawings, in which

Fig. 1 is a view in side elevation with parts in section of an apparatus embodying my invention;

Fig. 2 is a plan view of the transfer device looking in the direction of arrow 2 in Fig. 1;

Fig. 3 is an enlarged plan view showing the driving arrangement for the various parts of the apparatus;

Fig. 4 is a section taken on line 4—4 of Fig. 3;

Fig. 5 is a detail view of the means for driving the transfer device, and looking in the direction of arrow 5 in Fig. 1;

Fig. 6 is a plan view of the hopper and the adjacent end of the article-aligning chute, parts being broken away;

Fig. 7 is a section on line 7—7 of Fig. 6;

Fig. 8 is a section on line 8—8 of Fig. 6;

Fig. 9 is a detail view of the hopper actuating mechanism;

Fig. 10 is a section on line 10—10 of Fig. 9;

Fig. 11 is a view showing hopper details; and

Fig. 12 is a diagrammatic view showing a multiple hopper and chute arrangement.

The invention in this case has been illustrated as applied to a cartridge delivering and transfer device, but this is but one embodiment of the invention, which may be applied to articles of rod-shape or having flat, spherical, or any other shapes.

A rectangular frame 10 forming a base for the apparatus is provided, there being vertical supports 12, 14 adjacent the ends of the frame and taller supports 16 intermediate of the end supports. A cross bar 18 on supports 16 and a cross bar 20 on support 12 are located at different heights to journal a pair of closely spaced parallel rollers 22 at a desired incline. The exact inclination of the rollers is not germane to the issue of the invention but to illustrate an operative device, the inclination may be taken to be about 15°. Rollers 22 extend in general between a transfer device 24 and a hollow hopper 26, here shown as cylindrical, and the progress of the articles is in general from the top of the hopper, down the chute formed by the rollers, and out through the transfer device to whatever container or further transfer is desired.

Hopper 26 is here illustrated as set at an angle to the vertical to provide an approximately 90° angle to the axes of rollers 22, but this relation is not to be taken as necessary or determinative of the apparatus. A bracket 28 mounted on support 14 and this bracket in turn mounts a fixed sleeve-like journal 30 provided with bearings 32 for rotatively supporting a sleeve shaft 34 which is fixed to a gear 36 at its lower end by which it is rotated. Sleeve shaft 34 extends upwardly beyond journal 30, as shown in Fig. 9, and is fixed to a spider or pulley 38 which in turn is fixed as at its periphery to the inside wall surface of the hopper, whereby it will be seen that the hollow hopper will be rotated upon driving of gear 36.

Longitudinal strips 40 are diametrically or otherwise secured to the inside wall surface of the hopper in spaced pairs to provide a pair of guide slots or the like between them. These slots are adapted to guidingly and slidably receive depending radial fingers 42 at the edges of a hopper bottom or floor 44, so that the latter is longitudinally but not rotatively movable with respect to the hopper. Hopper bottom or floor 44 conforms in general to the cross-sectional shape of the hopper, and at its underside and centrally thereof it is fixed to a screw shaft 46 which dependingly extends down through the spider 38 and sleeve shaft 34 and below the gear 36.

A split nut 48 or the like as shown in Fig. 10 is provided with two pivoted parts 50 mounted on frame 10 in position to selectively engage the threads of screw shaft 46 at its sides or to be swung out of engagement therewith. The pivoted parts 50 may be locked in convenient manner as by a bolt or like means 52, and when operatively engaged with the screw shaft, the nut will be seen to be fixed to axially travel shaft 46. By the above described construction, it will be seen that as the hopper is rotated, it carries its floor 44 and fixed screw shaft 46 rotatively with it, and by the latter's engagement with fixed nut 48, the hopper floor will progress at a predetermined rate through the hopper although its position with respect to the hopper will not be influenced rotatively. If the floor 44 should by chance progress above the upper end of the hopper, fingers 42 will still keep it in guided condition relative to the hopper.

The hopper bottom or floor 44 is provided with a central hump 54 which slopes off radially in all directions towards the hopper wall to provide an annular channel between the hump and hopper wall for a purpose to be described.

At the top end of the hopper a peripheral collar 56 is provided for the purpose of preventing any undesired overflow at the high side of the hopper, and this collar is formed with an apron 58 at its low side to direct articles expelled from the hopper onto the rollers 22. Also a fixed mixer having two depending resilient fingers 60 may be supported above the hopper by any convenient means, such as bars 62 mounted on support 16, the fingers 60 acting as agitating devices for the articles being pushed up through the hopper by its floor 44 and aiding in directing them to the apron 58. As shown in Fig. 1, fingers 60 terminate just above the upper limit of the hopper in position to "skim" off the topmost articles in the hopper, but in many cases this mixer device is not necessary as the articles are expelled correctly merely due to the hopper action.

As shown in Fig. 11, a pair of free rollers 64 may be used at the low side of the hopper near its upper end to rotatively support it in conjunction with sleeve journal 30, these rollers being journaled on cross bar 18, or extensions 66 thereof.

Rollers 22 are adapted to be rotated in opposite directions by means of gears or the like indicated at 68, and a pulley 70 is fixed to one of the gears to drive the train by means of a belt from a pulley shaft 72 to be described. A pair of oppositely positioned shields 73 are individually mounted on bars 74 to form chutes or aprons at the sides of the rollers 22, and each shield is located to extend downwardly at an angle to a position directly over its roller, where it terminates in a free edge, see particularly Figs. 6 and 7. The shields are parallel to the rollers' axes, see Fig. 1, and the bars 74 may be bolted or otherwise secured to the cross bars 18, 20. As seen in Fig. 1, the shields terminate at their lower ends considerably short of the lower ends of rollers 22, as the alignment of the articles traveling down the apparatus is completed before they reach the end of the rollers. Staggered fins 76 are used to direct the articles, as indicated at 78, into the space between the rollers 22 if they should get up onto the shields and tend to fail to fall onto the rollers. Actually shields 73 and fins 76 act somewhat in the manner of the sides of a flume and retain all the articles in the aligning device, while at the same time directing them towards the space between the rollers.

The transfer device 24 comprises a rotating block which in the present instance is shown as a frusto-conical member having slots 80 arranged in its periphery parallel to its surface, the slots being separated by peripheral lands 81. These slots may be spaced according to the desired speed of rotation of the device or to the desired rate of delivery, and it is particularly to be noted that the invention does not depend on these slots or their spacing, it being only necessary to provide individual receiving means for the articles, which may be merely a continuous series of slightly spaced depressions. In fact, it is contemplated that the transfer device may rotate continuously and receive the articles from the rollers in almost substantially contacting or spaced relation as desired about the periphery of the transfer device. In any event, the transfer device or block 24 is rotated on a spindle 82 arranged at such an angle to the rollers 22 as to provide that slots 80 (or equivalent article receiving means) and lands 81 shall move past the lower or delivery ends of the rollers normal to the axes of the rollers, and in moving past the roller ends the slots are successively in position to receive an article in each article receiving means while lands 81 act as gates to hold back the remaining articles in the rollers. In other words, the article receiving slots 80 or the like, and the lands, wipe the delivery end of the rollers, and the slots are shaped to the particular articles which fall thereinto and are held by gravity or other means until the transfer device rotates so that the filled article receiving means are located successively at the low side of the device. At this point, the articles will fall out or be ejected in equal timed relation and at a predetermined rate of speed into the package, container, belt, or other device to which it is desired to feed the articles.

Frame 10 mounts a journal 84 for spindle 82, and a ratchet device 86 is here illustrated as a means for intermittently rotating the transfer device. However, as stated above, it is contemplated that in certain installations the transfer device will be continuously rotated and the ratchet would therefore not be used, spindle 82 then being continuously driven from shaft 72 at the speed desired.

A resilient hold-down bar 88 may be mounted on cross bar 20 to prevent undue rising up of the articles 78 as they progress down rollers 22. At the position of the hold-down 88 the articles will be in contacting relation and each article will tend to be urged down the chute by those behind, so that a slight tendency of the articles to rise up between the rollers may have to be obviated. In the present instance the hold-down is shown as pivoted at 90 and is resiliently held down by spring 92. A lip 94 ensures that all the articles will slip down under the hold-down bar. However, a dash-pot or other means could be used in place of the spring if desired.

Frame 10 supports a motor 96 operatively connected to drive a pulley 98 in turn driving a cross-shaft 100. The driving mechanism of the various devices are shown in general in Figs. 3, 4 and 5, wherein shaft 100 is illustrated as being journaled in bearings 102 on a frame bar 104 of the frame 10. By convenient reduction gearing 106, shaft 100 drives shaft 72 which extends along and is journalled in frame 10 to both ends thereof and mounts a pulley 108 for driving the roller pulley 70 by a belt, as by offset pulleys 109, and drives a shaft 110 by means of gears 112 to rotate gear 36 for the hopper 26. At its other end, shaft 72 rotates an eccentric 114 which oscillates a lever 116 pivoted in the frame 10 at 118 and which is held to the eccentric by a spring 120. Lever 116 in turn reciprocates a rod 122 to operate pawl 124 which intermittently rotates ratchet 86 in a known manner.

In the operation of the apparatus, the hopper floor 44 may be assumed to be at the top of the hopper and to have expelled all the articles of the previous charge. In order to recharge the hopper to continue the operation, the motor may be stopped, and the split nut 48 disengaged from the screw shaft 46, the latter and the hopper bottom thereupon descending to the lower end of the hopper. The split nut is re-engaged with the screw shaft and a full load of articles is then dumped helter-skelter into the hopper, the motor is started, and the hopper rotates taking with it the hopper floor 44 which starts to ascend under influence of the screw shaft. The topmost articles immediately begin to be spilled out onto the apron 58, and due to the gear and shaft arrangements previously designed to the correct speeds, substantially as many articles 78 as desired per period of time fall upon rollers 22 and shields 73 to progress down the chute to the transfer device. The mixer fingers 60 prevent any unwanted piling up in the hopper, if present, and the annular channel formed by the hump 54 and the hopper wall or collar 56 ensures proper delivery of the articles. For instance, if the hopper bottom 44 were flat, the last remaining articles would be apt to tumble out in a bunch when the bottom rises to the top of the hopper, but with the hump, the last remaining articles follow around in the channel and are expelled uniformly.

It will be noted that the hopper above described renders it unnecessary to disturb any but the topmost articles, the ones below the top merely traveling around in fixed relation to the hopper. This is in contradistinction to the conventional hopper wherein articles tumble down or are pushed forwardly in moving and bumping relation to each other with consequent friction, noise, and damage to the articles.

The helter-skelter articles are seen to be expelled from the hopper in a definite timed relation and at a predetermined rate relative to the rest of the apparatus, so that as the articles fall onto the rollers 22 and are aligned in the space between them, all with their smaller ends down, a definite number will line up at the lower end of the rollers in mutually contacting and pushing relation, so that the transfer device is always sure of having articles ready to be transferred, and no blank spots in the package or subsequent transferring means will occur. Also, the aligning rollers and transfer device will not clog due to an oversufficiency of articles from the hopper, and neither will they starve from too few.

In cases where a faster delivery from the transfer device is desired, it is only necessary to change the speed of shaft 72, or to change gearing 112 and the profile of eccentric 114. If the transfer device is to rotate continuously, then the screw shaft 46 is changed correspondingly. In the event that the hopper is to be charged without interrupting the action of the transfer device, it is merely necessary to open nut 48 without stopping the motor, whereupon the hopper floor will descend although still rotating.

Fig. 12 shows an arrangement of hoppers for continuous operation of a single aligning and transfer device, without in any way interrupting the latter. A plurality of hoppers 130 are mounted side by side and have the same or equivalent operating mechanism as hopper 26. A double inclined apron 132 is provided to lead the articles from both hoppers to the aligning rollers 22 and shields 73. In the operation of this modified form, one hopper is idle and being charged while the other operates to feed articles down its side of the apron, and when the latter is empty, the formerly idle hopper is started while the empty one has its floor let down for the next charge.

Having thus described my invention and the advantages thereof, I do not wish to be limited to the details herein disclosed, otherwise than as set forth in the claim, but what I claim is:

In an apparatus of the class described, a support, a hollow hopper mounted to rotate on said support, a floor movable through said hopper continuously to expel articles at a continuous controlled rate therefrom, means connecting said hopper and floor for axial sliding but non-rotative movement of the latter relative to the former, a screw shaft fixed to said floor, a drive shaft, a hollow shaft connected to said hopper, said screw shaft being located within said hollow shaft for axial movement relative thereto, means operatively connecting said drive shaft and said hollow shaft, a fixed nut adapted for engagement with said screw shaft, an inclined chute receiving the articles at a predetermined rate from the hopper, and means associated with the chute to align said articles in single file in the chute.

EINO E. LAKSO.